(12) United States Patent
Yamamoto

(10) Patent No.: US 11,648,919 B2
(45) Date of Patent: May 16, 2023

(54) BRAKING CONTROL DEVICE

(71) Applicant: ADVICS CO., LTD., Kariya (JP)

(72) Inventor: Yusaku Yamamoto, Tokai (JP)

(73) Assignee: ADVICS CO., LTD., Kariya (JP)

( * ) Notice: Subject to any disclaimer, the term of this patent is extended or adjusted under 35 U.S.C. 154(b) by 267 days.

(21) Appl. No.: 17/267,650

(22) PCT Filed: Sep. 20, 2019

(86) PCT No.: PCT/JP2019/036984
§ 371 (c)(1),
(2) Date: Feb. 10, 2021

(87) PCT Pub. No.: WO2020/066896
PCT Pub. Date: Apr. 2, 2020

(65) Prior Publication Data
US 2021/0188231 A1 Jun. 24, 2021

(30) Foreign Application Priority Data

Sep. 24, 2018 (JP) .............................. JP2018-178174

(51) Int. Cl.
*B60T 8/00* (2006.01)
*B60T 8/1755* (2006.01)
(Continued)

(52) U.S. Cl.
CPC ............ *B60T 8/1755* (2013.01); *B60T 8/245* (2013.01); *B60T 8/26* (2013.01); *B60T 8/58* (2013.01);
(Continued)

(58) Field of Classification Search
CPC .......... B60T 8/1755; B60T 8/245; B60T 8/26; B60T 8/58; B60T 2240/00;
(Continued)

(56) References Cited

U.S. PATENT DOCUMENTS

| 4,873,475 A * | 10/1989 | Togo .................... B62D 5/0457 |
| | | 318/489 |
| 6,476,515 B1 * | 11/2002 | Yamamoto .............. B60T 7/042 |
| | | 307/9.1 |

(Continued)

FOREIGN PATENT DOCUMENTS

| JP | 2007-008343 A | 1/2007 |
| JP | 2017109664 A | 6/2017 |

OTHER PUBLICATIONS

International Search Report (PCT/ISA/210) and translation and Written Opinion (PCT/ISA/237) dated Nov. 26, 2019, by the Japanese Patent Office as the International Searching Authority for International Application No. PCT/JP2019/036984.

*Primary Examiner* — Shardul D Patel
(74) *Attorney, Agent, or Firm* — Buchanan Ingersoll & Rooney PC

(57) ABSTRACT

A braking control device includes a first control unit configured to execute first control for reducing a target braking force, which is either a front-wheel braking force to be applied to front wheels of a vehicle or a rear-wheel braking force to be applied to rear wheels during increasing of deceleration of the vehicle, in a case that a behavior of the vehicle is unstable as the target braking force is increased; and a second control unit configured to execute second control for reducing a rate of increase in the target braking force and increasing a rate of increase in the front-wheel braking force or the rear-wheel braking force, which is not the target braking force, prior to execution of the first control.

7 Claims, 3 Drawing Sheets

(51) Int. Cl.
*B60T 8/24* (2006.01)
*B60T 8/26* (2006.01)
*B60T 8/58* (2006.01)

(52) U.S. Cl.
CPC ....... *B60T 2240/00* (2013.01); *B60T 2250/04* (2013.01); *B60T 2270/30* (2013.01)

(58) Field of Classification Search
CPC .. B60T 2250/04; B60T 2270/30; B60T 8/329; B60T 8/1766; B60T 8/28; B60T 8/00
USPC .......................................................... 701/70
See application file for complete search history.

(56) References Cited

U.S. PATENT DOCUMENTS

| | | | |
|---|---|---|---|
| 2002/0008423 A1* | 1/2002 | Yasui | B60T 8/246 303/9.62 |
| 2004/0104618 A1* | 6/2004 | Yamamoto | B60T 7/042 303/20 |
| 2017/0210361 A1* | 7/2017 | Kotera | F16D 65/183 |
| 2018/0141527 A1* | 5/2018 | Hara | B60T 8/58 |
| 2019/0092376 A1* | 3/2019 | Panse | B60R 25/02 |
| 2020/0033858 A1* | 1/2020 | Xiao | B60W 30/18 |
| 2020/0223409 A1* | 7/2020 | Satoh | B60T 8/17 |
| 2021/0009143 A1* | 1/2021 | Niewiadomski | B62D 15/0285 |

\* cited by examiner

BRAKING CONTROL DEVICE

TECHNICAL FIELD

The present disclosure relates to a braking control device.

BACKGROUND ART

Known is a braking control device configured to execute pitching suppression control for suppressing pitching during braking so that a passenger can feel comfort in a vehicle. For example, a braking force control device disclosed in JP-A-2017-109664 executes pitching suppression control for making a braking force to be applied to rear wheels larger than a braking force based on a braking force distribution, in a nose dive state. Thereby, a tendency of nose dive is suppressed during braking, so that ride comfort is enhanced during the braking.

CITATION LIST

Patent Literature

PTL 1: JP-A-2017-109664

SUMMARY

Technical Problem

However, according to the device of the related art, in a vehicle state in which antiskid control (ABS control) should be executed, the antiskid control is preferentially executed, and execution of specific control such as pitching suppression control is stopped. In this case, although stability of the vehicle is secured, comfort in the vehicle is likely to suddenly change.

The present invention has been made in view of the above situations, and an object thereof is to provide a braking control device capable of improving sustainability of effects of specific control under execution while maintaining stability of a vehicle.

Solution to Problem

A braking control device of the present disclosure includes a first control unit configured to execute first control for reducing a target braking force, which is either a front-wheel braking force to be applied to front wheels of a vehicle or a rear-wheel braking force to be applied to rear wheels during increasing of deceleration of the vehicle, in a case that a behavior of the vehicle is unstable as the target braking force is increased, and a second control unit configured to execute second control for reducing a rate of increase in the target braking force and increasing a rate of increase in the front-wheel braking force or the rear-wheel braking force, which is not the target braking force, prior to execution of the first control.

Advantageous Effects

According to the above configuration, in the braking control device configured to execute control (specific control) for increasing the target braking force at the start of braking, the rate of increase in the target braking force is reduced by the second control, before execution of the first control for reducing the target braking force. Thereby, the sudden change or disappearance of the effects of the specific control due to reduction in the target braking force is suppressed, and the stability is improved due to the reduction in the rate of increase in the target braking force. That is, the second control is executed prior to execution of the first control, so that execution of the first control is suppressed, making it possible to improve sustainability of the effects of the specific control under execution while maintaining stability of the vehicle.

DESCRIPTION OF EMBODIMENTS

Figure 1:
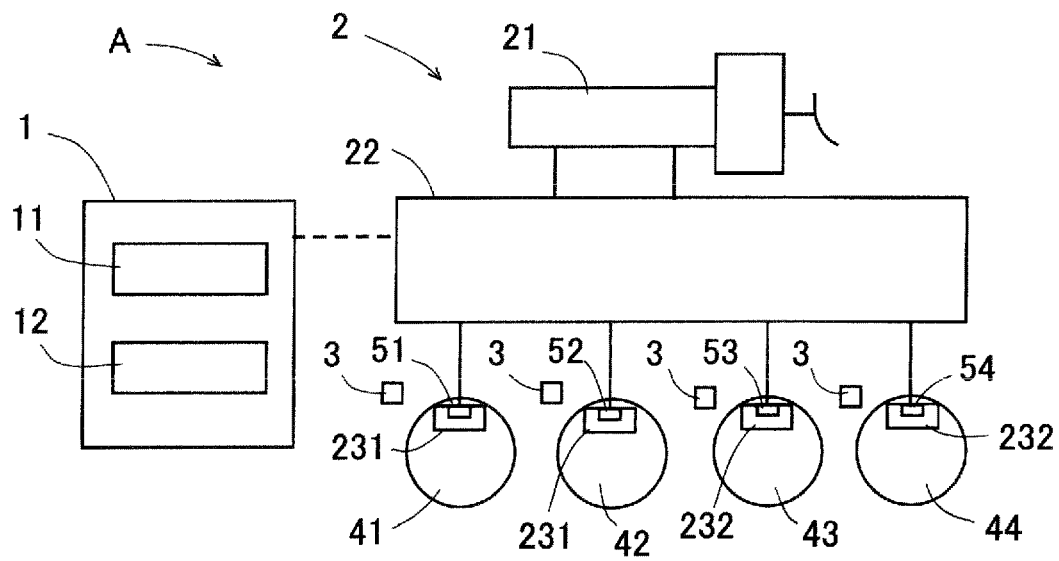
FIG. 1 is a configuration view of a vehicular braking device including a braking control device of the present embodiment.

Hereinbelow, embodiments of the present disclosure will be described with reference to the drawings. The respective drawings are conceptual views used for descriptions. As shown in FIG. 1, a vehicular braking device A of the present embodiment includes a braking control device 1, a braking force generating device 2, wheel speed sensors 3, and wheels 41, 42, 43, 44. For example, the wheel 41 is a right front wheel, the wheel 42 is a left front wheel, the wheel 43 is a right rear wheel, and the wheel 44 is a left rear wheel. The wheel speed sensors 3 are each a sensor configured to detect a wheel speed, and are each provided to each of the wheels 41 to 44. The wheel speed sensors 3 are each configured to transmit wheel speed information, which is a detection result, to the braking control device 1. The braking force generating device 2 is a well-known device, and is briefly described with reference to an example.

The braking force generating device 2 is a device configured to generate hydraulic pressures (wheel pressures) in wheel cylinders 51, 52, 53, 54 provided to the wheels 41 to 44, thereby generating friction braking forces (hydraulic pressure braking forces) on the wheels 41 to 44. The braking force generating device 2 includes a master cylinder mechanism 21 configured to generate a master pressure according to a driver's operation on a brake, an actuator 22 configured to adjust each wheel pressure as the master pressure is supplied thereto, and friction braking devices 231 and 232 configured to generate the friction braking forces.

The actuator 22 is a well-known ESC actuator, and includes a plurality of electromagnetic valves, an electric pump, a reservoir and the like, which are not shown. The actuator 22 can execute independently pressurization control, decompression control, holding control and the like for each of the wheel cylinders 51 to 54, based on a command from the braking control device 1. The actuator 22 can also execute antiskid control (ABS control), sideslip prevention control and the like, for example, based on a command from the braking control device 1.

The friction braking devices 231, 232 are each a disc brake device or a drum brake device, for example, and are each provided to each of the wheels 41 to 44. The friction braking devices 231, 232 each have each of the corresponding wheel cylinders 51 to 54. Note that, in the present embodiment, the friction braking devices 231 provided to the front wheels 41, 42 and the friction braking devices 232 provided to the rear wheels 43, 44 have different characteristics in a relation between a wheel pressure and a braking force. Specifically, when an equal wheel pressure is applied to the friction braking device 231 and the friction braking device 232, the braking force is higher in the friction braking device 231 than in the friction braking device 232.

The braking control device 1 is an Electronic Control Unit (ECU) including a CPU, a memory and the like, and is a device configured to control the braking force generating device 2 (particularly, the actuator 22). The braking control device 1 is configured to calculate a target deceleration of a vehicle, based on a traveling situation or a driver's operation on a brake, and to set a target wheel pressure (target braking force) for each of the wheels 41 to 44 according to the target deceleration and diverse conditions. The braking control device 1 is configured to control the actuator 22 according to each target wheel pressure.

The braking control device 1 of the present embodiment is configured to execute pitching suppression control for increasing the braking force on the rear wheels 43, 44 so as to suppress pitching of the vehicle during increasing of deceleration of the vehicle. The braking control device 1 of the present embodiment is configured to control the braking forces on the front and rear wheels, based on a braking force distribution on the front and rear wheels preset for the pitching suppression control.

The braking force distribution (hereinbelow, referred to as "predetermined braking force distribution") for the pitching suppression control is set so that a ratio of the braking force on the rear wheels 43, 44 in the braking force distribution is larger than a preset standard braking force distribution. The standard braking force distribution is, for example, a braking force distribution that is set according to a difference between the braking forces on the front and rear wheels that are generated when the wheel pressures for the front and rear wheels are controlled to be an equal pressure. That is, the standard braking force distribution is set using the characteristic difference of the friction braking devices 231, 232, and is achieved by maintaining the wheel pressures for the front and rear wheels at an equal pressure. In the standard braking force distribution, the braking force on the front wheels 41, 42 is always larger than the braking force on the rear wheels 43, 44.

Therefore, when the pitching suppression control is executed, the control is executed based on the predetermined braking force distribution, not the standard braking force distribution. According to the pitching suppression control, the braking force on the rear wheels 43, 44 is more likely to increase, as compared to the control based on the standard braking force distribution, so that it is possible to suppress a pitching state (nose dive state) by a geometry effect of a suspension.

Here, the braking control device 1 has, as functions, a first control unit 11 and a second control unit 12. The first control unit 11 is configured to execute first control for reducing a target braking force, which is either a front-wheel braking force to be applied to the front wheels 41, 42 of the vehicle or a rear-wheel braking force to be applied to the rear wheels 43, 44 during increasing of deceleration of the vehicle, in a case that a behavior of the vehicle is unstable as the target braking force is increased. In other words, when the behavior of the vehicle is unstable, the first control unit 11 executes the first control for reducing a braking force on control target wheels that are either the front wheels 41, 42 or the rear wheels 43, 44, which are causes of the instability. A "rate of increase" is a value equal to or larger than 0.

More specifically, the first control unit 11 of the present embodiment detects the unstable wheels 41 to 44, based on slip ratios calculated from the wheel speeds and a vehicle speed, and executes the first control for the unstable wheels 41 to 44, for example. The first control of the present embodiment corresponds to the antiskid control. In this way, the first control unit 11 determines whether the behavior of the vehicle is unstable, based on the wheel speeds of the front wheels 41, 42 or the rear wheels 43, 44 to which the target braking force is applied, and reduces the target braking force when it is determined that the behavior of the vehicle is instable.

The second control unit 12 is configured to execute second control for reducing a rate of increase in the target braking force and increasing a rate of increase in the front-wheel braking force or the rear-wheel braking force, which is not the target braking force, prior to execution of the first control. More specifically, the second control unit 12 executes the second control for making a rate of increase in the braking force of one side of the front wheels 41, 42 and the rear wheels 43, 44, which is assumed to be the control target wheels of the first control, smaller than a rate of increase based on the predetermined braking force distribution and making a rate of increase in the braking force of the other side of the front wheels 41, 42 and the rear wheels 43, 44 larger than the rate of increase based on the predetermined braking force distribution, prior to execution of the first control. It can be said that the second control of the present embodiment is control for reducing a ratio of the braking force of one side of the front wheels 41, 42 and the rear wheels 43, 44, which is assumed to be the control target wheels of the first control, in the braking force distribution, prior to execution of the first control.

In the present embodiment, the pitching suppression control is executed as braking starts, for example. Therefore, the rear-wheel braking force is more likely to be larger than usual, so that the rear wheels 43, 44 are likely to be relatively unstable. That is, during the pitching suppression control, a probability that the first control (antiskid control) will be executed for the rear wheels 43, 44 is relatively high. Therefore, the second control unit 12 executes the second control for the rear-wheel braking force, which is applied to the rear wheels 43, 44 assumed as the control target wheels of the first control, as the target braking force.

The second control unit 12 is configured to determine whether to execute the second control, based on values obtained by differentiating at least once the wheel speeds of the front wheels 41, 42 or the rear wheels 43, 44 (here, the rear wheels 43, 44) to which the target braking force is applied. More specifically, the second control unit 12 executes the second control when a difference between a front wheel acceleration obtained by differentiating once the wheel speeds of the front wheels 41, 42 and a rear wheel acceleration obtained by differentiating once the wheel speeds of the rear wheels 43, 44 is larger than a first threshold value. That is, the second control unit 12 makes a ratio of the rear-wheel braking force in the braking force distribution smaller than a case that the difference between the rear wheel acceleration and the front wheel acceleration is equal to or smaller than the first threshold value. The second control is control for reducing a rate (inclination) of increase in the rear-wheel braking force while maintaining a state in which the rate of increase in the rear-wheel braking force is larger than zero (0). Hereinbelow, this control is referred to as distribution change control.

The second control unit 12 also executes the second control when a difference between an acceleration of the vehicle and the rear wheel acceleration is larger than a second threshold value. The second control that is executed in this case sets the rate of increase in the rear-wheel braking force to a minimum value (0), thereby increasing only the front-wheel braking force. That is, the second control that is executed when the difference between the acceleration of the vehicle and the rear wheel acceleration is larger than the second threshold value is control for increasing only the front-wheel braking force according to the increase in the target braking force of the vehicle while maintaining the rear-wheel braking force. Hereinbelow, this control is referred to as target holding control. In this way, the second control unit 12 executes the distribution change control or the target holding control, as the second control, depending on situations. Note that, the acceleration of the vehicle is a value obtained by differentiating once the vehicle speed calculated based on the detection results of the wheel speed sensors 3, for example.

As long as a state in which the difference between the front wheel acceleration and the rear wheel acceleration (hereinbelow, referred to as "front and rear acceleration difference") is larger than the first threshold value is detected, the second control unit 12 continues to change the distribution ratio of the braking force (i.e., executes the distribution change control), according to a magnitude of the front and rear acceleration difference. Note that, the target holding control executed once is continuously executed until a predetermined condition is fulfilled, irrespective of a magnitude of the difference between the acceleration of the vehicle and the rear wheel acceleration (hereinbelow, referred to as "entire acceleration difference"). Examples of the predetermined condition include a condition that the wheel pressures of the front and rear wheels is equal, a condition that the entire acceleration difference or the front and rear acceleration difference is equal to or smaller than a predetermined value, a condition that a ratio of the target braking force in the braking force distribution is a predetermined ratio, and the like.

Figure 2:
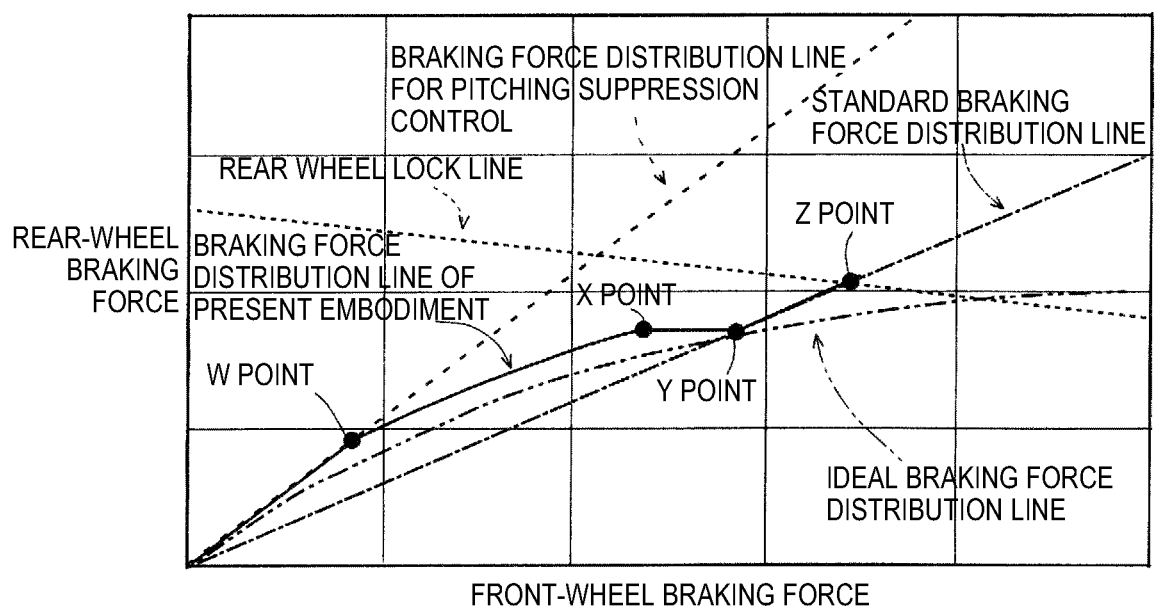
FIG. 2 illustrates braking force distribution lines of the present embodiment.
Figure 3:
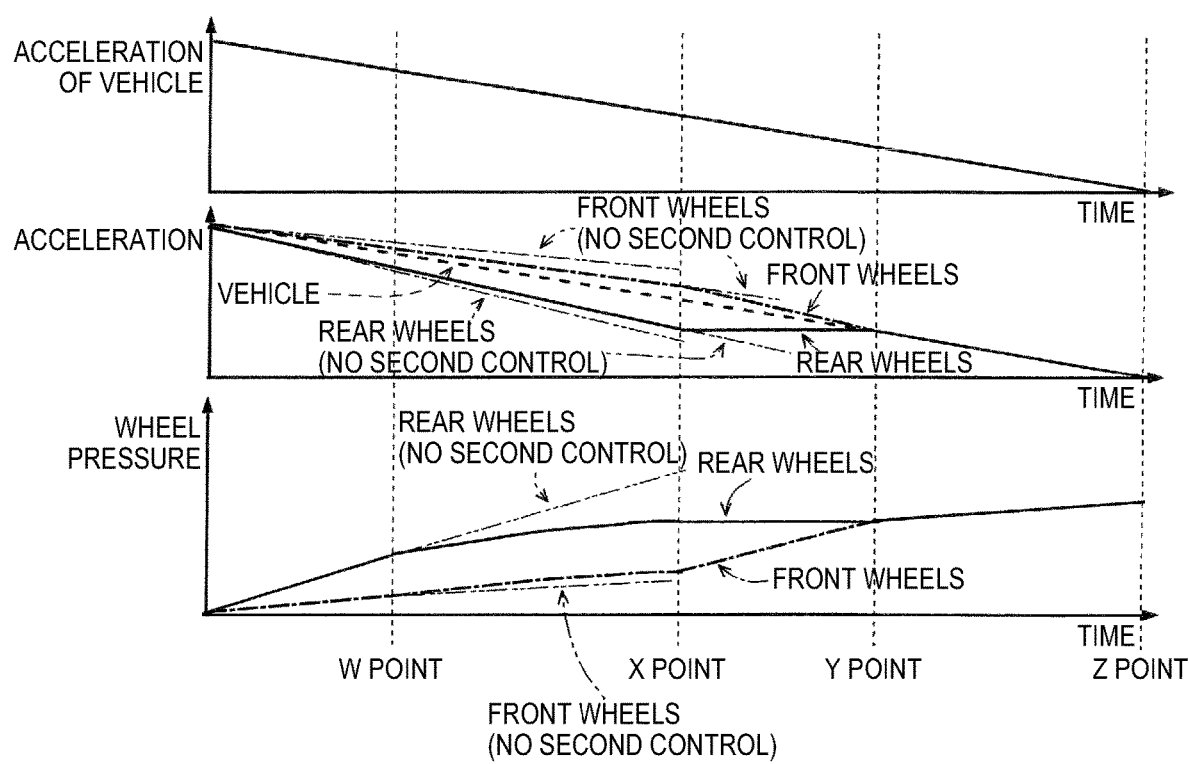
FIG. 3 is a time chart for illustrating control states of the present embodiment.

The braking control device 1 of the present embodiment is described based on a specific example, with reference to FIGS. 2 and 3. FIG. 2 depicts a braking force distribution line for the pitching suppression control, a braking force distribution line of the present embodiment, a standard braking force distribution line, a rear wheel lock line, and an ideal braking force distribution line. Note that, the ideal braking force distribution line is a line indicating a braking force distribution at which a limit braking force can be exerted at the same time on the front and rear wheels, and can be changed depending on the specifications of the vehicle, a passenger situation, and the like. It can be said that the ideal braking force distribution line represents a situation in which the assumed specific example is placed. FIG. 3 depicts a time chart of the acceleration of the vehicle (it can also be referred to as target deceleration), a time chart of the wheel acceleration (rotation acceleration), and a time chart of the wheel pressures (target wheel pressures) of the front and rear wheels, from above. In the specific example, the target deceleration of the vehicle changes with a constant rate.

As shown in FIG. 3, in the pitching suppression control, the rate of decrease in the rear wheel acceleration is larger than the rate of decrease in the front wheel acceleration, and the front and rear acceleration difference is larger from the start of braking toward a W point. The second control unit 12 determines that the front and rear acceleration difference exceeds the first threshold value at the W point, based on the detection results of the wheel speed sensors 3 and the differential calculation, and executes the distribution change control, as the second control.

As a result, the rate of increase in the wheel pressures of the rear wheels 43, 44 is smaller than before the W point, i.e., before the second control is executed, and the rate of increase in the wheel pressures of the front wheels 41, 42 is larger than before the W point, i.e., before the second control is executed. That is, the rate of increase in the rear-wheel braking force is smaller than before the second control is executed, and the rate of increase in the front-wheel braking force is larger than before the second control is executed. When executing the distribution change control, the second control unit 12 determines a correction value for the braking force distribution, based on a preset map indicating a relation between the "front and rear acceleration difference" and the "correction value for the braking force distribution". Then, the second control unit 12 corrects (changes) the braking force distribution, based on the correction value.

For example, the second control unit 12 calculates the front and rear acceleration difference, compares the calculated front and rear acceleration difference and the first threshold value, and determines whether to execute the distribution change control, with a predetermined period. When the front and rear acceleration difference is larger than the first threshold value even after the distribution change control is executed, the second control unit 12 changes the braking force distribution according to the front and rear acceleration difference.

After the W point, the increase in the front and rear acceleration difference is suppressed due to the execution of the distribution change control. However, since the rate of decrease in the rear wheel acceleration is larger, as compared to the rate of decrease in the acceleration of the vehicle, the entire acceleration difference is larger toward an X point. The second control unit 12 determines that the entire acceleration difference exceeds the second threshold value at the X point, based on the detection results of the wheel speed sensors 3 and the differential calculation, and executes the target holding control, as the second control. Thereby, the wheel pressures of the rear wheels 43, 44, i.e., the rear-wheel braking force is held constant, and the wheel pressures of the front wheels 41, 42, i.e., only the front-wheel braking force increases as the target deceleration (target braking force) of the vehicle increases. As a result, the rate of increase in the rear-wheel braking force is smaller than before the second control is executed (before the X point), and the rate of increase in the front-wheel braking force is larger than before the second control is executed (before the X point).

The entire acceleration difference and the front and rear acceleration difference become smaller from the X point toward a Y point, and is zero at the Y point. That is, at the Y point, the acceleration of the vehicle, the front wheel acceleration and the rear wheel acceleration coincide with each other. Here, the second control unit 12 ends the target holding control (second control). After the Y point, the braking control device 1 changes the wheel pressures of the front and rear wheels to an equal pressure according to the change in the target deceleration of the vehicle, based on the standard braking force distribution line.

According to the control in the specific example, as shown in FIG. 2, the front-wheel braking force and the rear-wheel braking force change according to the braking force distribution line for the pitching suppression control from the start of braking to the W point, the ratio of the rear-wheel braking force in the braking force distribution is smaller from the W point to the X point than before the W point, the ratio of the rear-wheel braking force in the braking force distribution is further smaller from the X point to the Y point than before the X point, and the front-wheel braking force and the rear-wheel braking force change according to the standard braking force distribution line after the Y point.

In the present embodiment, since the control is executed in consideration of stability of the vehicle while executing the pitching suppression control, the braking force distribution resultantly changes in conformity to the situation of the vehicle, i.e., the ideal braking force distribution line. It can be said that the second control unit 12 executes the second control so as to bring the braking force distribution line close to the ideal braking force distribution line. Since the second control of the present embodiment is control for changing the braking force distribution, the braking force as a whole is maintained and the deceleration of the vehicle is a value based on the target deceleration. The magnitude relation of the ratio of the rear-wheel braking force in the braking force distribution is such that the ratio from the start of braking to the W point>the ratio from the W point to the X point>the ratio from the X point to the Y point≥the ratio after the Y point.

Here, an example of a flow of the second control of the present embodiment is described with reference to FIG. 4. When braking starts, the braking control device 1 sets the braking force distribution to the braking force distribution for the pitching suppression control. When determining the braking force distribution thereafter, a following flow is executed with a predetermined period. The second control unit 12 has experienced that the entire acceleration difference exceeds the second threshold value, and determines whether the wheel pressures of the front wheels 41, 42 and the wheel pressures of the rear wheels 43, 44 are equal (S101), during brake control (after the start of increase in the braking force until the braking force is zero (0)). In other words, the second control unit 12 determines whether the predetermined condition for ending the target holding control, which is one of the second control, is fulfilled (S101).

Here, for example, when the wheel pressures of the front wheels 41, 42 and the wheel pressures of the rear wheels 43, are different (S101: No), the second control unit 12 determines whether the entire acceleration difference is larger than the second threshold value (S102). When it is determined that the entire acceleration difference is equal to or smaller than the second threshold value (S102: No), the second control unit 12 determines whether the front and rear acceleration difference is larger than the first threshold value (S103). When it is determined that the front and rear acceleration difference is equal to or smaller than the first threshold value (S103: No), the braking control device 1 maintains the currently set braking force distribution without changing the same (S104). That is, the braking control device 1 controls the braking force on the front and rear wheels, based on the braking force distribution for the pitching suppression control.

On the other hand, when it is determined that the front and rear acceleration difference is larger than the first threshold value (S103: Yes), the second control unit 12 determines a correction value corresponding to the front and rear acceleration difference, based on the predetermined map, when executing the distribution change control (S105). Then, the second control unit 12 corrects (changes) the braking force distribution, based on the determined correction value (S106).

When it is determined that the entire acceleration difference is larger than the second threshold value (S102: Yes), the second control unit 12 stores the current rear-wheel braking force (target braking force) (S107). Then, the second control unit 12 maintains the rear-wheel braking force at the stored value, and increases the front-wheel braking force to an amount corresponding to an amount of increase in the target deceleration of the vehicle (S108). That is, the second control unit 12 executes the target holding control.

When it is determined that the predetermined condition is fulfilled (S101: Yes), the braking control device 1 increases the front-wheel braking force and the rear-wheel braking force according to an increase in the target deceleration (S110) while maintaining the state in which the wheel pressures of the front wheels 41, 42 and the wheel pressures of the rear wheels 43, 44 are equal (S109). That is, the braking control device 1 controls the braking forces on the front and rear wheels, based on the standard braking force distribution. The braking control device 1 determines the braking force distribution by each of steps S104, S106, S108 and S109, and controls the braking forces on the front and rear wheels 41 to 44, based on the braking force distribution and the target deceleration (S110).

(Summary of Configurations and Effects)

As described above, the braking control device 1 of the present embodiment includes the first control unit 11 configured to execute the first control for reducing the target braking force, which is either the front-wheel braking force to be applied to the front wheels 41, 42 of the vehicle or the rear-wheel braking force to be applied to the rear wheels 43, 44 during increasing of deceleration of the vehicle, in a case that a behavior of the vehicle is unstable as the target braking force is increased, and the second control unit 12 configured to execute the second control for reducing the rate of increase in the target braking force and increasing the rate of increase in the front-wheel braking force or the rear-wheel braking force, which is not the target braking force, prior to execution of the first control.

According to the above configuration, in a braking control device configured to execute the specific control for making the target braking force, which is the braking force on the control target wheel, larger than usual (for example, the standard braking force distribution), the rate of increase in the target braking force is reduced by the second control, prior to execution of the first control for reducing the target braking force. Thereby, the sudden change or disappearance of the effects of the specific control due to reduction in the target braking force is suppressed, and the stability is improved due to the reduction in the rate of increase in the target braking force. That is, the second control is executed prior to execution of the first control, so that execution of the first control is suppressed, making it possible to improve sustainability of the effects of the specific control under execution while maintaining stability of the vehicle.

More specifically, according to the present embodiment, it is possible to sustain the effects of the specific control, for example, without executing the antiskid control (without actuating the ABS), within a range in which the vehicle is not unstable. When the first control is executed, since the target braking force is reduced, the effects of the specific control achieved as a result of increasing the target braking force disappears. For example, in a case that the specific control is the pitching suppression control, the effects of increasing the rear-wheel braking force to suppress a nose dive state and improving the comfort of the passenger disappear as the first control is executed. However, in the present embodiment, an amount of increase in the target braking force per unit time is reduced prior to execution of the first control. Therefore, although the effects of the specific control are reduced, the disappearance of the effects of the specific control due to execution of the first control is suppressed. According to the present embodiment, it is possible to improve sustainability of the effects of the specific control under execution while maintaining the stability of the vehicle.

The braking control device 1 of the present embodiment is a device configured to execute the pitching suppression control for increasing the rear-wheel braking force so as to suppress the pitching of the vehicle during increasing of deceleration of the vehicle. The first control unit 11 executes the first control for the rear-wheel braking force increased by the pitching suppression control, as the target braking force. The second control unit 12 reduces the rate of increase in the rear-wheel braking force, which is the target braking force, and increases the rate of increase in the front-wheel braking force, which is not the target braking force, prior to execution of the first control by the first control unit 11. According to this configuration, as described above, the reduction in the rear-wheel braking force by the first control is suppressed and the rate of increase in the rear-wheel braking force is made small, so that it is possible to suppress the sudden change in the comfort of the passenger and to sustain the comfort of a predetermined level while maintaining the stability of the vehicle.

In the present embodiment, the first control unit 11 determines whether the behavior of the vehicle is unstable, based on the wheel speeds of the front wheels or the rear wheels to which the target braking force is applied, and the second control unit 12 determines whether to execute the second control, based on the values obtained by differentiating the wheel speeds at least once. A change in the behavior of the wheels 41 to 44 appears as a change in a value of the wheel acceleration wheel speeds obtained by differentiating once the wheel speeds, faster than the wheel speeds. Therefore, the second control unit 12 that uses the wheel acceleration as a determination element can perceive the change in the behavior faster than the first control unit 11 that uses the wheel speeds as a determination element, and can execute the second control at a more appropriate timing (i.e., prior to execution of the first control).

In general, for each of the wheels 41 to 44, a friction circle can be drawn according to an axle load and a coefficient of friction of a road surface. A radius of the friction circle indicates a limit braking force that is a limit value at which a linear grip force can be secured. It can be said that the closer the braking force is to a boundary line of the friction circle, a slip is more likely to occur. In most situations, the friction circles of the front wheels 41, 42 and the friction circles of the rear wheels 43, 44 have different sizes, depending on the specifications of the vehicle and the control situations.

In the present embodiment, the second control unit 12 determines whether to execute the second control, based on the front and rear acceleration difference. It can be said that the front and rear acceleration difference is a numerical value of the margin of the rear-wheel braking force with respect to the friction circle, based on the front wheels 41, 42. For example, in the present embodiment, the rear-wheel braking force is larger than the front-wheel braking force due to the pitching suppression control. Therefore, it can be determined that the larger the front and rear acceleration difference is, the larger the slip of the rear wheels 43, 44 is, and the margin of the rear-wheel braking force with respect to the friction circle is relatively small. Even when the friction circles of the rear wheels (one side) is relatively smaller than the friction circles of the front wheels (the other side) due to the specifications of the vehicle and the like, the determination can be made in the similar manner to the above, based on the front and rear acceleration. Thereby, it is possible to execute the second control (distribution change control) at a timing prior to execution of the first control, according to the states of the rear wheels 43, 44.

In the present embodiment, the second control unit 12 determines whether to execute the second control, based on the values obtained by differentiating at least once the wheel speeds of the front wheels or the rear wheels to which the target braking force is applied and a value obtained by differentiating the vehicle speed at least once. According to this configuration, it is possible to quickly perceive the change in the behavior of the target wheels (rear wheels 43, 44) in the similar manner to the above, so that it is possible to execute the second control at an appropriate timing (i.e., prior to execution of the first control).

It can be said that a difference between an acceleration of the vehicle that is a value obtained by differentiating once the vehicle speed and an acceleration of the wheel (rotation acceleration) that exerts the target braking force is a numerical value of the margin of the target braking force with respect to the friction circle, based on the acceleration of the vehicle. By using the acceleration of the vehicle as a basis, it is possible to more directly detect the states of the rear wheels 43, 44 (the margin of the friction circles with respect to the rear-wheel braking force). Thereby, the second control unit 12 can execute the second control (target holding control) at an appropriate timing corresponding to the situation. Note that, in the present embodiment, the state in which the entire acceleration difference exceeds the second threshold value indicates that the rear-wheel braking force is closer to the limit value than the state in which the front and rear acceleration difference exceeds the first threshold value.

In the specific example of the present embodiment, it can be said that the control from the start of braking to the W point and the control from the W point to the X point are controls having a priority on comfort. It can be said that the control after the X point is control having a priority on stability. In this way, according to the present embodiment, it is possible to change the priorities on the comfort and the stability according to the situations, and to achieve both the comfort and the stability as much as possible.

First Modified Embodiment

In a first modified embodiment of the present embodiment, the second control unit 12 is configured to execute, as the second control, the target holding control for holding the target braking force and increasing the front-wheel braking force or the rear-wheel braking force, which is not the target braking force, according to an increase in the target deceleration, and to end the target holding control when a ratio of the rear-wheel braking force in the braking force distribution is a predetermined ratio. That is, the second control unit 12 continues to execute the target holding control even after the Y point in FIGS. 2 and 3 and until the ratio of the rear-wheel braking force in the braking force distribution is the predetermined ratio.

The predetermined ratio may be set to a ratio smaller than a braking force ratio at which the wheel pressures of the front and rear wheels is equal, for example. In this case, unlike FIG. 3, the second control unit 12 holds the wheel pressures of the rear wheels 43, 44 and increases the wheel pressures of the front wheels 41, 42 according to the increase in the target deceleration, even after the wheel pressures of the front and rear wheels is equal (even after the Y point). According to this configuration, it is possible to execute control having a priority on the front-wheel braking force, which increases the stability of the vehicle.

Figure 4:
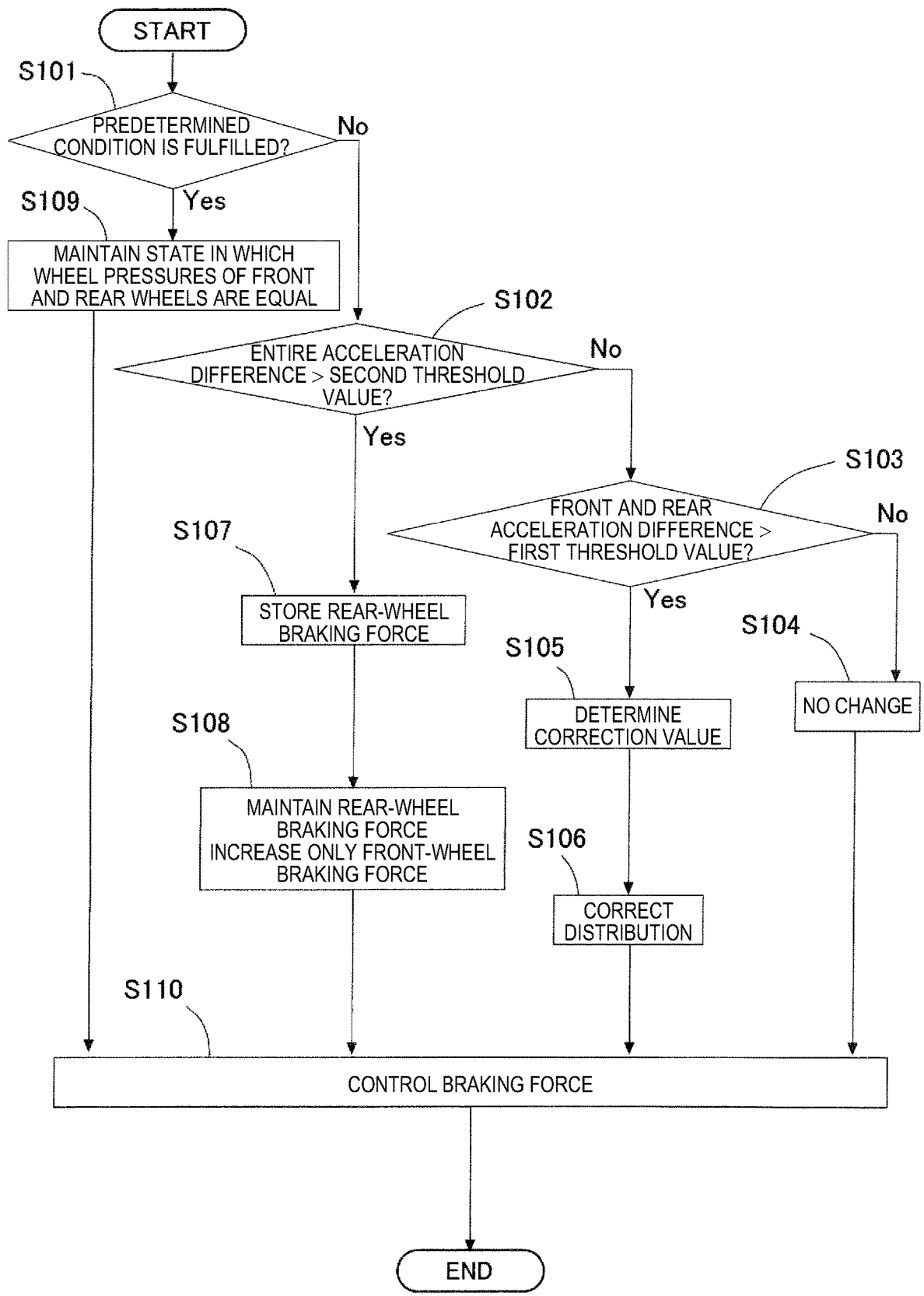
FIG. 4 is a flowchart showing a flow of second control of the present embodiment.

In the first modified embodiment, steps S101 and S109 of FIG. 4 are replaced, as follows, for example. When the second control unit 12 has experienced that the entire acceleration difference exceeds the second threshold value and the ratio of the rear-wheel braking force in the braking force distribution is the predetermined ratio (S101: Yes), the second control unit 12 increases the front-wheel braking force and the rear-wheel braking force according to the increase in the target deceleration while holding the predetermined ratio (S109).

Second Modified Embodiment

In a second modified embodiment of the present embodiment, the second control unit 12 is configured to reduce the rate of increase in the target braking force and to increase the rate of increase in the front-wheel braking force or the rear-wheel braking force that is not the target braking force, with an amount of change set according to a time after the deceleration of the vehicle increase until it is determined that the second control is to be executed (a time period from the start of braking to the W point in FIG. 3). That is, the second control unit 12 increases the amount of change in the rate of increase as the time from the start of braking to the W point is shorter. Thereby, for example, in a state where the front and rear acceleration difference increases immediately after braking starts, for example, a state where the friction circles of the rear wheels 43, 44 are extremely small, it is possible to further reduce the rate of increase in the rear-wheel braking force, and to maintain the stability without reducing the rear-wheel braking force. That is, according to the second modified embodiment, it is possible to execute the second control according to the situations, and to avoid execution of the first control with high accuracy.

<Others>

The present disclosure is not limited to the above embodiments. For example, the target braking force is not limited to the rear-wheel braking force and may also be the front-wheel braking force. For example, in the pitching suppression control for suppressing a nose lift state, the increase in the front-wheel braking force may be interpreted as the increase in the target braking force, and the rate of increase in the front-wheel braking force may be reduced by the second control. The specific control is not limited to the pitching suppression control, and may be any control for making the braking force on one side of the front wheels 41, 42 and the rear wheels 43, 44 larger than usual (standard). The execution timing of the second control is not limited to the above. For example, the distribution change control may be executed as the second control from the start of braking. The second control unit 12 may also be configured to execute the second control according to a driver's instruction (a button operation and the like) or a determination result as to a road surface situation, for example.

As for the acceleration of the vehicle, a detection result of an acceleration sensor may be used as a differential value of the vehicle speed. The second control unit 12 can also use, as the determination element, a wheel jerk obtained by differentiating the wheel speed twice or a vehicle jerk obtained by differentiating the vehicle speed twice, for example. In this way, the control target and the comparison target are values (values of the same unit) differentiated by the same number of times. The braking force generating device 2 may also be a device capable of independently controlling the braking force on each of the wheels 41 to 44.

For example, a device having a master cylinder with a ball screw configured to advance and retreat by a motor or a device having a device capable of exerting a regenerative braking force is possible. The present disclosure can also be applied to a vehicle configured to perform automatic driving or automatic braking. In the above descriptions, the acceleration may be rephrased as the deceleration, and the rate of decrease in the acceleration is the rate of increase in deceleration.

Note that, the braking control device 1 of the present embodiment can be described as follows.

The braking control device 1 of the present embodiment is a braking control device configured to control braking forces on the front and rear wheels 41 to 44, based on a predetermined braking force distribution for the front and rear wheels 41 to 44, during increasing of deceleration of a vehicle. The braking control device includes the first control unit 11 configured to execute first control for reducing a braking force on control target wheels, which are the front wheels 41, 42 or the rear wheels 43, 44 that are a cause of instability, in a case that a behavior of the vehicle is unstable, and the second control unit 12 configured to execute second control for making a rate of increase in the braking force on one side of the front wheels 41, 42 and the rear wheels 43, 44 assumed as the control target wheels smaller than a current rate of increase and making a rate of increase in the braking force on the other side of the front wheels 41, 42 and the rear wheels 43, 44 larger than the current rate of increase, prior to execution of the first control. The rate of increase is a value equal to or larger than zero (0). It can be said that the second control is control for reducing a ratio of the braking force on one side of the front wheels 41, 42 and the rear wheels 43, 44 assumed as the control target wheel in the braking force distribution.

In the present embodiment, the predetermined braking force distribution is used for the pitching suppression control that is executed so as to suppress the pitching of the vehicle, and is set so that the ratio of the braking force on the rear wheels 43, 44 in the braking force distribution is larger than the preset standard braking force distribution, and the wheels assumed as the control target wheels are the rear wheels 43, 44.

The invention claimed is:

1. A braking control device comprising:
   a first control unit configured to execute first control for reducing a target braking force, that is either a front-wheel braking force applied to front wheels of a vehicle or a rear-wheel braking force applied to rear wheels during increasing of deceleration of the vehicle, in a case that a behavior of the vehicle is unstable as the target braking force is increased; and
   a second control unit configured to execute second control for reducing a rate of increase in the target braking force and increasing a rate of increase in the front-wheel braking force or the rear-wheel braking force that is not the target braking force, before execution of the first control.

2. The braking control device according to claim 1, wherein the braking control device is configured to execute pitching suppression control for increasing the rear-wheel braking force so as to prevent pitching of the vehicle during increasing of deceleration of the vehicle, and
   wherein the first control unit is configured to execute the first control with an increase in the rear-wheel braking force by the pitching suppression control as an increase in the target braking force.

3. The braking control device according to claim 2, wherein the second control unit is configured to execute, as the second control, target holding control for holding the target braking force and increasing the front-wheel braking force or the rear-wheel braking force that is not the target braking force, according to an increase in target deceleration, and to end the target holding control when a ratio of the rear-wheel braking force in a braking force distribution is a predetermined ratio.

4. The braking control device according to claim 2, wherein the first control unit is configured to determine whether the behavior of the vehicle is unstable, based on wheel speeds of the front wheels or the rear wheels to which the target braking force is applied, and
wherein the second control unit is configured to determine whether to execute the second control, based on values obtained by differentiating the wheel speeds once.

5. The braking control device according to claim 1, wherein the first control unit is configured to determine whether the behavior of the vehicle is unstable, based on wheel speeds of the front wheels or the rear wheels to which the target braking force is applied, and
wherein the second control unit is configured to determine whether to execute the second control, based on values obtained by differentiating the wheel speeds once.

6. The braking control device according to claim 5, wherein the second control unit is configured to determine whether to execute the second control, based on values obtained by differentiating the wheel speeds once and a value obtained by differentiating a speed of the vehicle once.

7. The braking control device according to claim 6, wherein the second control unit is configured to execute, as the second control, target holding control for holding the target braking force and increasing the front-wheel braking force or the rear-wheel braking force that is not the target braking force, according to an increase in target deceleration, and to end the target holding control when a ratio of the rear-wheel braking force in a braking force distribution is a predetermined ratio.

* * * * *